United States Patent [19]

Schauer

[11] Patent Number: 5,230,713
[45] Date of Patent: Jul. 27, 1993

[54] DEVICE FOR THE TRANSMISSION OF CURRENT BETWEEN TWO END POINTS

[75] Inventor: Friedrich Schauer, Heroldsberg, Fed. Rep. of Germany

[73] Assignee: kabelmetal electro Gesellschaft mit beschränkter Haftung, Hanover, Fed. Rep. of Germany

[21] Appl. No.: 978,306

[22] Filed: Nov. 17, 1992

Related U.S. Application Data

[60] Continuation of Ser. No. 847,530, Mar. 6, 1992, abandoned, which is a division of Ser. No. 782,423, Oct. 25, 1991, abandoned.

[30] Foreign Application Priority Data

Nov. 17, 1990 [DE] Fed. Rep. of Germany ....... 4036680

[51] Int. Cl.⁵ .............................................. H01R 35/04
[52] U.S. Cl. ........................................ 29/856; 29/878; 29/858; 439/15; 439/164
[58] Field of Search ................................. 439/15, 164; 29/854–856, 858, 878, 883; 174/117 F

[56] References Cited

U.S. PATENT DOCUMENTS

| | | | |
|---|---|---|---|
| 4,657,326 | 4/1987 | Zeller et al. | 439/15 |
| 4,744,763 | 5/1988 | Suzuki et al. | 439/164 |
| 4,813,878 | 3/1989 | Schauer | 439/16 |
| 4,824,396 | 4/1989 | Sasaki et al. | 439/15 |
| 4,904,190 | 2/1990 | Plocek et al. | 439/15 |
| 4,943,240 | 7/1990 | Karlsson | 439/15 |

Primary Examiner—Gary F. Paumen
Attorney, Agent, or Firm—Martin A. Farber

[57] ABSTRACT

The invention relates to a device for the transmission of current between two end points between which there is arranged a ribbon cable (10) having at least two electric conductors. The cable is contained in a housing, serves for electrical connection, and extends in coils. The length of the conductors is substantially greater than the distance between the two end points. At least one of the two end points is moveable relative to the other. For a simple connecting of a further extending line, metal conductors (14), which are insulated from each other, are connected in electrically conductive manner at their two ends to the conductors of the ribbon cable (10). The metal conductors have a course wherein their free ends, developed as contact pins, are accessibly in the completely mounted device from the outside of the housing through a passage opening (16) in a wall (1a) thereof.

3 Claims, 3 Drawing Sheets

５,230,713

DEVICE FOR THE TRANSMISSION OF CURRENT BETWEEN TWO END POINTS

RELATED APPLICATION

This application is a continuation of my co-pending application Ser. No. 07/847,530 filed: Mar. 6, 1992, now abandoned, which in turn is a divisional application of Ser. No. 07/782,423 filed: Oct. 25, 1991, now abandoned.

FIELD AND BACKGROUND OF THE INVENTION

The present invention relates to a device for transmitting current between two end points between which there extends a ribbon cable arranged in a housing and having at least two electric conductors, the ribbon cable which serves for the electrical connection being coiled and its length being substantially greater than the distance between the two end points, at least one of the two end points being moveable relative to the other and conductors of a further extending line being adapted to be electrically connected to the conductors of the ribbon cable (German OS 36 41 706).

Apparatus having such devices are used, for instance, for the feeding of currents for impact protection in an automotive vehicle, in which case an electric conductor is arranged in the steering wheel thereof. One essential problem in connection with these instruments is the transmission of current between fixed and moveable parts. This problem occurs in all devices in which there are two end points which are moveable relative to each other and one of which is developed, in most cases, as a fixed point. The wiper contacts or wiper rings which have been known for a long time for such cases are subject to wear and are disadvantageous particularly in the case of low current intensities, in view of the varying contact resistances.

In the aforementioned device known from German OS 36 41 706, the transmission of current is effected by the ribbon cable which is mounted in the manner of a spring housing. Upon a relative rotary movement of the two end points which are connected by the ribbon cable, the coiled ribbon cable changes in diameter, or "breathes", like the spring of a clock. The windings are contracted to a small diameter in the one direction of rotation. In the other direction of rotation they return to a larger diameter. Conductors of a further extending line are connected to the insulated conductors of the ribbon cable. In this way, a complete device consisting of coiled ribbon cable and connected further extending lines is created. This device can be used only for a specific case of use to which the length and shape of the further extending lines are adapted. The connection of other lines to the ribbon cable requires other tools.

SUMMARY OF THE INVENTION

It is an object of the invention so further to develop the above-mentioned device that further extending lines of any shape can be connected in simple manner to the conductors of the ribbon cable.

According to the invention, metal conductors (14) which are insulated from each other are connected to the conductors (11) of a ribbon cable (10) at its two ends, the metal conductors being so arranged that their free ends, developed as contact pins, are accessible in the completely mounted device from outside the housing (2) through a passage opening in the wall (1) of the housing.

This device can be used regardless of the nature of the further extending line or lines. It is merely necessary to connect, to an end of the further conducting lines, contacts with their conductors and which can be connected directly or indirectly to the ends of the metal conductors which are developed as contact pins. The entire device can be produced as a closed unit, for instance in the form of a cassette which has passage openings for a connecting of the further extending lines at two places. In this connection, lines of any desired construction can be connected by means of suitable adapters. The finishing or making-up of the ribbon cable is very simple in structure since it is merely necessary to contact the metal conductors to the conductors of the ribbon cable.

According to a feature of the invention, the metal conductors (14) are arranged together in a contact holder (17) arranged within the housing (2).

Further according to the invention, the contact holder (17) extends through a passage opening (16) in the housing (2), and is provided at the end thereof extending out of the housing (2) with elements, or holes, (18) for engagement with a connector element, or adapter, (19) placed upon the contact holder 17.

Still further, the invention provides that an anti-kink yoke (23) extending over the end of the ribbon cable (10) is fastened to the contact holder (17).

Yet according to another feature of the invention, the metal conductors (14) are bent 90°.

Moreover by the invention the metal conductors (14) are connected to the conductors (11) of the ribbon cable (10).

Another feature of the invention is that the metallic conductors (14) are welded to the conductors (11) of the ribbon cable (10).

Also the invention provides that the metal conductors (14) are soldered to the conductors (11) of the ribbon cable (10).

The invention also provides a method for producing such a device with the following steps: the metal conductors (14) combined into a unit (25) are embedded in a contact holder (17); the conductors (14) after fixing in the contact holder (17), are separated from each other; the conductors (14) are then connected in one operation with the conductors (11) of the ribbon cable (10); and the finished ribbon cable (10) is finally introduced into the housing (2) with the contact holder (17) lying in a passage opening (16) in the wall (1) of the housing (2).

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
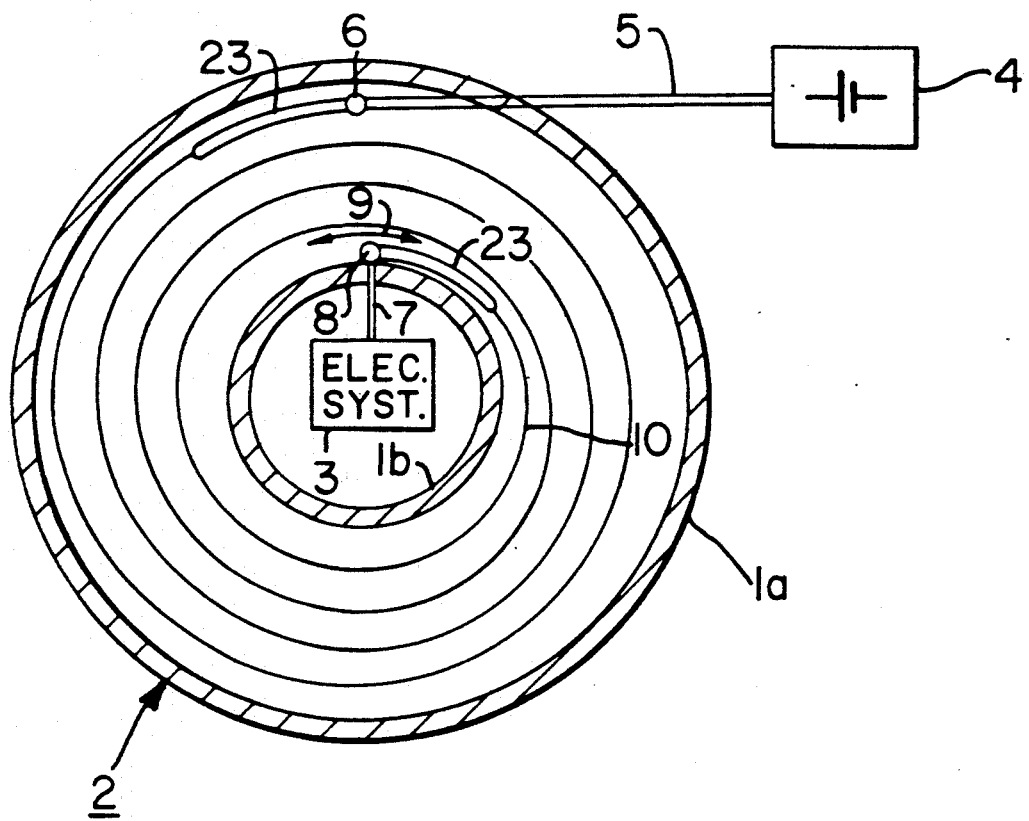
FIGS. 1 and 2 are diagrammatic cross sections through two different units having a device in accordance with the invention.

FIG. 1 shows diagrammatically two walls 1a and 1b, developed, for instance, in circular form, of the housing 2 of an electrical unit. This unit can, for instance, be a control unit installed in the steering wheel of a motor vehicle. For the supplying of an electronic system 3 of the unit with current, the unit is connected to the battery 4 of the motor vehicle. The battery 4 is connected via an electric line 5 to an end point 6 which is developed as a fixed point. The electronic system 3 is connected via an electric line 7 to an end point 8 which is moveable in the direction indicated by the double-ended arrow 9. Between the two end points 6 and 8 there is a ribbon cable 10. In the embodiment shown in FIGS. 3 and 4, the ribbon cable 10 has six conductors 11 (two of which are indicated diagrammatically) which may also be of different cross section. At least two conductors 11 should be present in the ribbon cable 10. The lines 5 and 7 (FIG. 1) are "further extending lines" which are to be connected to the ribbon cable 10.

As shown in FIG. 1, the ribbon cable 10 can be arranged in several turn between the two end points 6 and 8 and, therefore, in the manner of a clock spring housing. Although the number of turns of a steering wheel is limited to about six, substantially more than six turns should be provided for the ribbon cable 10. The turning movement of the end point 8 then does not make a substantial change in the curvature of an individual turn of the ribbon cable 10. The diameter of the coil consisting of all the turns of the ribbon cable 10 is then merely reduced or increased in size. The ribbon cable 10 preferably has flat conductors 11. This embodiment of the ribbon cable 10 is particularly thin and, therefore, takes up very little space. In principle the ribbon cable 10 could, however, also have round conductors.

Figure 2:
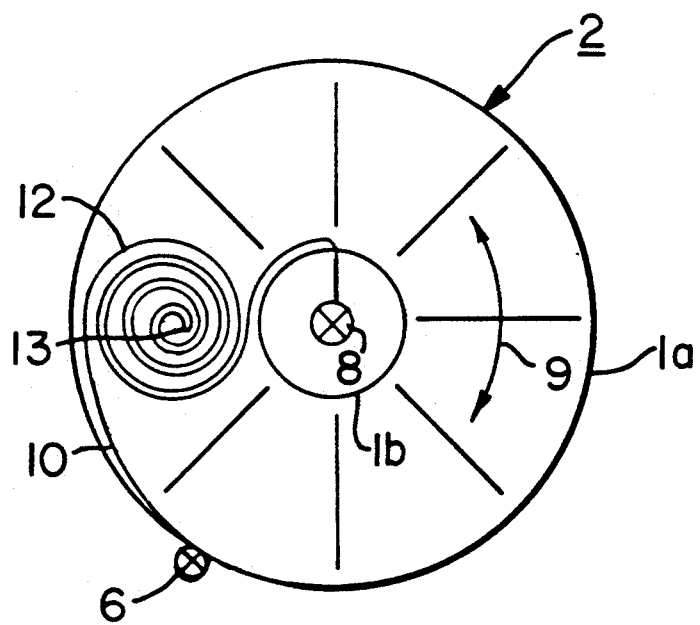

The ribbon cable 10 can be coiled between the two end points 6 and 8, as shown in FIG. 2, also in the form of a bifilar coil 12. Within the bifilar coil 12 the ribbon cable 10 is bent back approximately at its center so that a place of reversal 13 results. As from that place the ribbon cable 10 is coiled in two layers. When its two ends are pulled in opposite direction, the bifilar coil 12 produced by the winding decreases its diameter. As a result of the elasticity of the ribbon cable 10, it winds itself up again when the pulling forces acting at its ends cease. The diameter of the bifilar coil 6 in the staring point of the device is advisedly so selected that it is equal to the shortest distance between the two end points 6 and 8, or less than that distance.

For making up the two ends of the ribbon cable 10, metal conductors 14 are connected in electrically conductive manner to conductors 11 (FIG. 6) of the ribbon cable 10. The ribbon cable 10 has six of the conductors 11 in the embodiment shown. Accordingly, six metal conductors 14, insulated from each other, are provided, connected at connecting places 15 to the conductors 11 of the ribbon cable 10, for example, by soldering or welding or by striking.

The free ends of the conductors 14 are developed as contact pins on which corresponding mating contacts can be placed. In the embodiment shown they are bent 90° so that, in operation, they lie within a passage opening 16 in the wall 1 of the housing 2. The conductors 14 may also be linear and extend further in the same direction as the conductors 11 of the ribbon cable 10 if the passage opening 16 is, for instance, provided in the circumferential surface of the housing 2. They are, in each case, so arranged in the passage opening 16 that mating contacts can be applied from the outside. The conductors 14 are preferably fastened in a contact holder 17 consisting of insulating material.

The contact holder 17 can be prefabricated. However, it can also be molded around the metal conductors 14. The contact holder 17 extends through the passage opening 16 and is provided on its free end with elements for the engagement by spring action of parts adapted to be placed thereon. These elements are formed, for example, as holes 18 into which resilient elements of a plug or adapter can engage.

Figure 4:
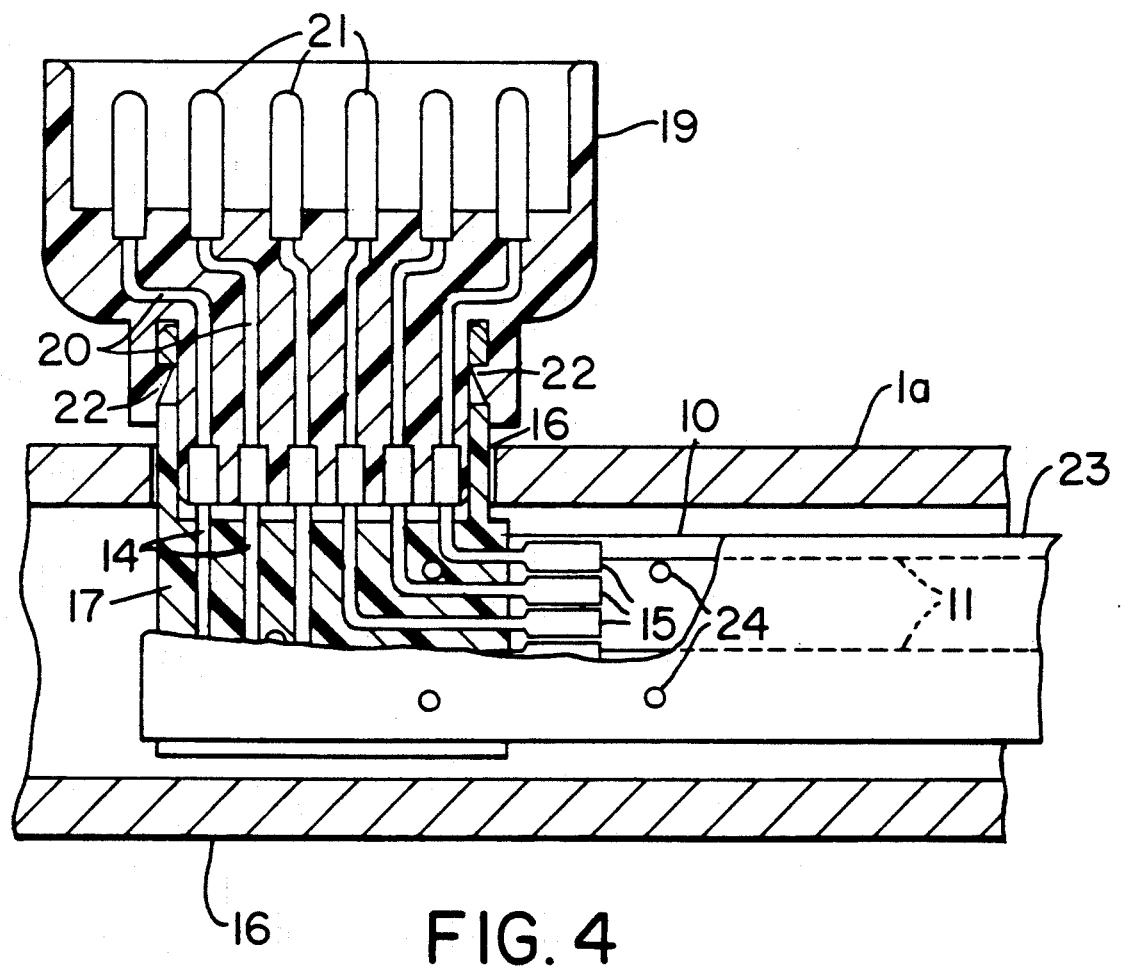
FIG. 4 shows the embodiment of FIG. 3 including a connecting element.

Such an adapter 19 is shown in FIG. 4, and may be shaped in any desired manner at its free end and be adapted to special desires of a customer. On the side on which the adapter 19 is to be placed on the conductors 14, it must be developed so as to mate with the conductors 14. In the adapter 19, there are conductors 20, insulated from each other, wherein individual ones of the conductors 20 contact one end of respective ones of the conductors 14. At the other end of the conductors 20, plug pins 21 of variable size and spacing may be provided.

The plug pins 21 establish connection with the further extending line 5 or 7, and can be of different development, depending on the embodiment of the further extending line 5 or 7. The adapter 19 can be placed on the contact holder 17, in which case end point noses 22 (FIG. 4) of the adapter 19 engage into the holes 18 in the contact holder 17.

Above the places 15 of connection of the conductors 14 to the conductors 11 of the ribbon cable 10, an anti-kink yoke 23 can be provided extending around the contact holder 17 and over the ribbon cable 10. Movements of the ribbon cable 10 are precluded by the yoke 23 from affecting the connecting places 15. In order, furthermore, to achieve strain relief of the connecting places 15, the ribbon cable 10 and also the contact holder 17 can have holes 24 into which corresponding pins (not shown) of the anti-king yoke 23 engage. The anti-kink yoke 23 furthermore, can be connected pointwise by ultrasonic welding to the ribbon cable 10 and/or the contact holder 17.

Figure 3:
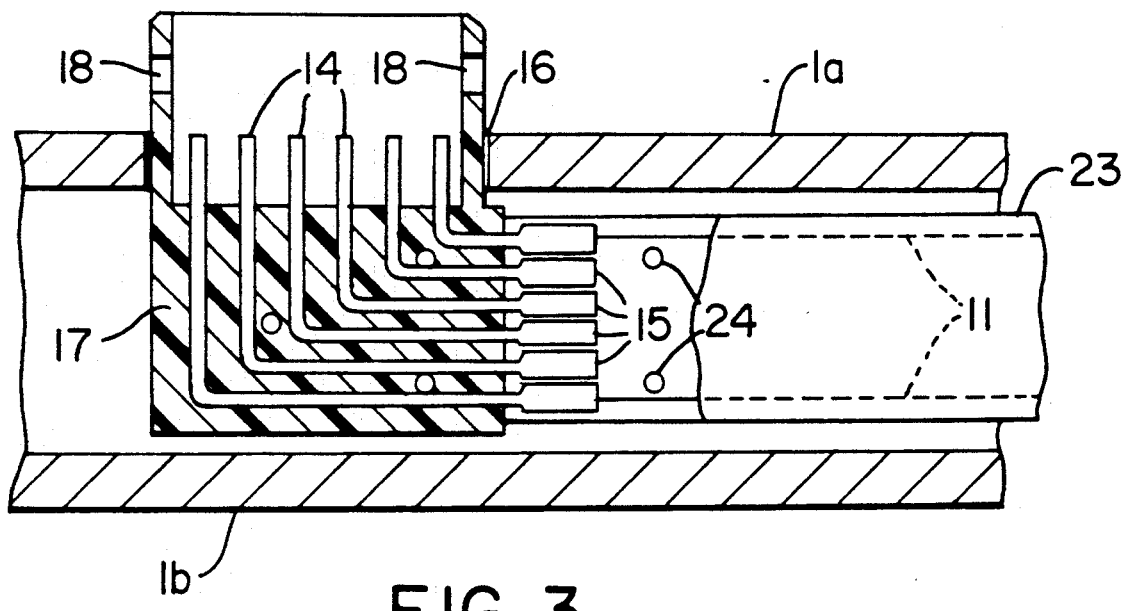
FIG. 3 shown on a larger scale, and in section, one end of the ribbon cable inserted in the device.
Figure 5:
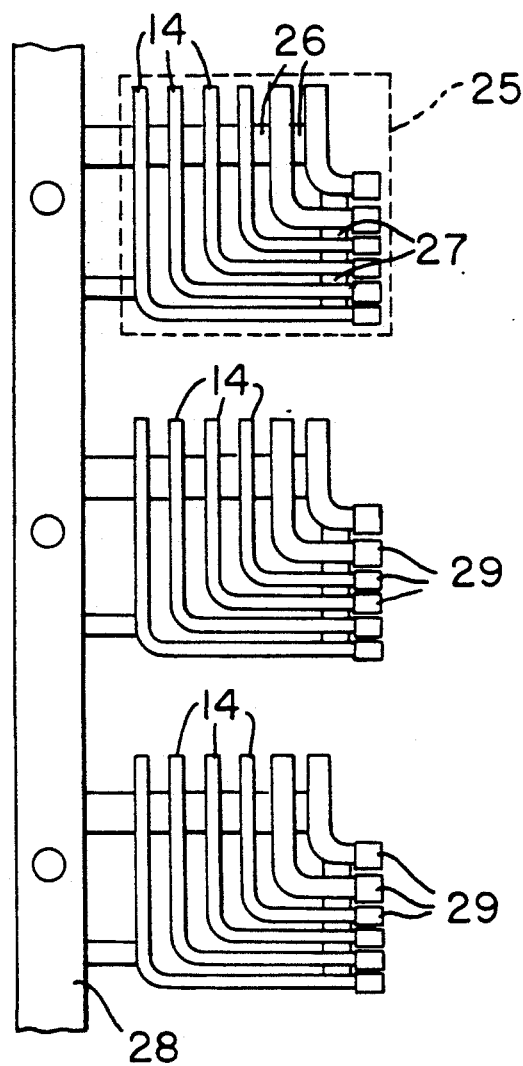
FIGS. 5 and 6 show details of the device.

For the production of a made-up ribbon cable 10, prefabricated parts 25 with the conductors 14 can, for instance, be used, as can be noted from the portion surrounded by a dashed-line box in FIG. 5. In the structural part 25, the individual conductors 14 are connected to each other by webs 26 and 27. They can e fastened to a continuous strip 28 whereby automatic assembly is facilitated. Striker parts 29 or flat zones for welding or soldering can be arranged on the ends intended for connection to the conductors 11 of the ribbon cable 10 at the places 15 (FIGS. 3 and 4). The conductors 14 of the parts 25 are again shown bent in FIGS. 5 and 6, in accordance with the embodiment shown in FIGS. 3 and 4. However, they may also be straight.

Figure 6:
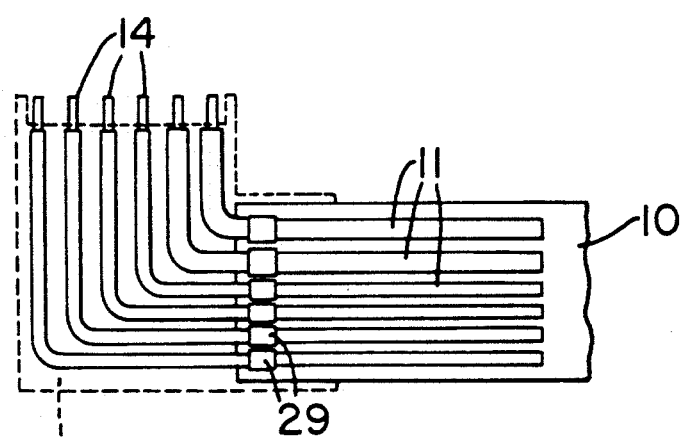

The contact holder 17 is, first of all, formed around a part 25. This can preferably be done by injection molding. However, a prefabricated contact holder 17 can also be used. As soon as the conductors 14 are fixed in the contact holder 17, the webs 26 and 27 are stamped out by punching through the contact holder 17 so that the conductors 14 are insulated from each other. The contact holder 17 which is thus provided with conductors 14 can then be fastened in one operation to the end of the ribbon cable 10. In principle, it would also be possible first of all to fasten the part 25, to the end of the ribbon cable 10, and then apply the contact holder 17. The finished end of a suitably made-up ribbon cable 10 is shown in FIG. 6. The conductors 11 of the ribbon cable 10 are also shown herein. They may be of different cross sections, to which the cross sections of the conductors 14 are to be adapted. The contact holder 17 is indicated in dashed line. The finished made-up ribbon cable 10 can be inserted into the housing 2 of the corresponding device.

I claim:

1. A method for producing an electrical connecting device having a housing with a coiled ribbon conductor cable therein, the cable extending between two end points which are moveable relative to each other, there being a set of metal conductors within the housing for making electrical connection between conductors of the cable at one of said end points and the conductors of an extending electrical line located outside the housing, wherein the method comprises steps of providing a passage opening in a wall of the housing;

combining the metal conductors in to a unit having at least one metallic web interconnecting the metal conductors, and fixing the metal conductors in a contact holder;

after said fixing step, insulating said metal conductors from each other;

connecting the metal conductors in one operation with conductors of the ribbon cable; and introducing the ribbon cable and connected metal conductors into the housing with the contact holder lying in the passage opening in a wall of the housing, said step of introducing including a step of presenting ends of said metal conductors via said holder as contact pins in said passage opening for mating with said conductors of said extending electrical line.

2. A method according to claim 1, wherein said step of combining said metal conductors is accomplished by providing electrically conducting webs between said metal conductors.

3. A method according to claim 2, wherein said insulating step is accomplished by stamping out portions of the webs through said contact holder.

* * * * *